United States Patent [19]

Neri et al.

[11] 4,028,286

[45] June 7, 1977

[54] INK TRANSFER MEMBER

[75] Inventors: Joseph Dominic Neri, Colorado Springs, Colo.; John Lewis Williams, Rochester, N.Y.

[73] Assignee: Burroughs Corporation, Detroit, Mich.

[22] Filed: June 30, 1975

[21] Appl. No.: 591,856

[52] U.S. Cl. ........................ 260/2.5 P; 260/23 XA; 260/33.2 R; 260/33.4 R

[51] Int. Cl.[2] ............................................ C08J 9/00

[58] Field of Search ......... 260/2.5 P, 23 R, 23 XA, 260/33.2 R, 33.4 R, 42.21, 42.49

[56] References Cited

UNITED STATES PATENTS

| | | | |
|---|---|---|---|
| 2,989,493 | 6/1961 | Clark et al. | 260/23 |
| 3,725,325 | 4/1973 | Takeda et al. | 260/33.4 R |

*Primary Examiner*—J. Ziegler

*Attorney, Agent, or Firm*—Kevin R. Peterson; Lynn L. Augspurger

[57] ABSTRACT

An improved ink releasing member of the plastisol matrix type having a liquid ink supported within a matrix from which it is expressible on the application of pressure. The ink employs a liquid vehicle and a pigment dye or combination pigment and dye colorant material. The vehicle for the ink can be liquid polyglycol alone or a composite mixture of animal, vegetable, mineral, marine, or synthetic oily material along with a polyglycol. By using polyglycols in the liquid ink, the smoking and air pollution encountered in the manufacture of plastisol matrix ink releasing members is reduced while a product with higher color intensity and longer useful life is produced.

11 Claims, No Drawings

INK TRANSFER MEMBER

BACKGROUND OF THE INVENTION

1. Field of the Invention

The present invention relates to an improved plastisol matrix ink releasing member suitable for duplicating and so-called "carbon paper" applications.

2. Description of the Prior Art

In the manifolding and duplicating art, there has been a significant change over the past several years from the total transfer type of carbon paper to the ink releasing type. In the total transfer carbon paper, carbon particles are suspended in a wax medium supported on a paper substrate. Writing or impact pressure applied to an original sheet in contact with the paper substrate caused a portion of the wax layer corresponding to the writing or type face to totally transfer to a copy sheet in contact with the wax surface. Considerable difficulty has been encountered with this paper in view of the softness of the wax layer and its tendency to mark anything it comes in contact with. Also, since the duplicating paper functioned by totally transferring portions of the wax coating, the useful life of the paper tended to be short.

In order to overcome the aforementioned problem, ink releasing duplicating or carbon papers were developed. The ink releasing types of carbon paper are prepared using a solution or dispersion of a synthetic organic resin, a plasticizer for the resin, a liquid ink vehicle which may also be a plasticizer for the resin and colorant materials. The solution or dispersion is then coated on a suitable substrate and dried by evaporation of a solvent or formation of a plastisol to form a matrix of the synthetic resin containing the liquid ink. The liquid ink is retained within the matrix making the surface of the duplicating sheet clean to the touch. The liquid ink is expressible from the matrix on selective application of pressure. The partially depleted portions of the matrix are restored by the migration of ink from other areas substantially increasing the useful life of the duplicating sheet.

Duplicating sheets prepared from solution are disclosed by Ralph H. Clark in U.S. Pat. No. 2,944,037, issued July 5, 1960, assigned to the assignee of the instant application. Duplicating sheets prepared from plastisol forming dispersions are disclosed by the same Ralph H. Clark in U.S. Pat. No. 2,989,493, issued June 20, 1961, also assigned to the assignee of the instant application.

The ink releasing members of the present invention are an improvement over the plastisol matrix ink transfer composition disclosed in U.S. Pat. No. 2,989,493, which patent is incorporated herein by reference.

The ink-transfer compositions of U.S. Patent No. 2,989,493 were prepared from finely divided polyvinyl chloride resin particles dispersed in liquid organic vehicles containing coloring matter. The liquid organic vehicle was a mixture of a plasticizer operative to solvate the polyvinyl chloride resin particles on heating to the fusing temperature, a heat polymerizable resin to blend with the polyvinyl chloride resin during fusing, and an organic liquid which is substantially non-drying, substantially non-volatile at normal room temperatures, and sufficiently incompatible with and present in sufficient quantity to migrate and to be expressible from the fused resin under pressure. A colorant material such as a dye and/or pigment is carried by the latter organic liquid. The composition can also include minor amounts of catalysts, stabilizers and fillers.

In order to obtain good writing intensity and a reasonably useful life from the ink transfer composition, a large amount of organic liquid vehicle is employed to carry the colorant materials. It was found that 25% to 30% by weight of oils are necessary to produce the proper writing intensity, however, such a large amount presents serious difficulties during the fusion process. To fuse or cure the plastisol, temperatures in the range of 175° C to 205° C are necessary. At these temperatures, large volumes of the releasing oils are driven off from the coating surface either polluting the air or requiring extensive equipment to remove the oil from the air. The expense of the wasted oil and the expense for the equipment necessary to control this wasted oil add substantially to the production cost of the ink-transfer member.

SUMMARY OF THE INVENTION

Accordingly, it is an object of the present invention to provide an ink transfer, member free of the aforementioned difficulties.

The ink releasing member of the present invention is an improvement on the ink transfer members disclosed and claimed in the aforementioned U.S. Pat. No. 2,989,493. According to the teaching of the present invention, it is possible to reduce and substantially eliminate the air pollution hazard by reducing the amount of conventional releasing oil used and to replace the oil with a substantially water insoluble and non-hygroscopic polyglycol which has a low viscosity at room or ambient temperature and a low vapor pressure at the plastisol fusion temperature of 175° C to 205° C and which is capable of dissolving or dispersing a colorant material.

The preferred polyglycols are those of polypropylene having a molecular weight of approximately 1000 to 5000. Compounds having molecular weights below 1000 tend to be water soluble while compounds above 5000 tend to be solid. Other polyglycols including mixed polyglycols can be used so long as they meet the basic requirements of being substantially non-water soluble and non-hygroscopic, have a low viscosity at room temperature, have a low vapor pressure at the plastisol fusion temperature and the ability to dissolve or disperse colorant materials.

In the plastisol composition, the polyglycol can replace all of the oil vehicle. The composition can contain approximately 15% by weight plastisol and, preferably, approximately 5% to 8%. Since polyglycols are substantially more expensive than the conventional oil vehicles, preferably only enough should be used to meet the air pollution and write intensity requirements.

DETAILED DESCRIPTION OF THE INVENTION

The ink releasing members of the present invention are of the plastisol type in which an organic synthetic resin is dispersed in a liquid plasticizer which does not solvate the resin at room temperature but which, on heating to the fusion temperature of 175° C to 205° C is capable of solvating the resin. The dispersion of resin and plasticizer has added to it a noncompatible oil which can function as a nonsolvating plasticizer for the resin as well as a liquid vehicle for colorant materials such as dyes, pigments and mixtures of dyes and pigment. A heat polymerizable resin can also be added to alter the physical properties of the fused plastisol.

Other incidental materials can also be added such as stabilizers, fillers, and catalysts.

For a more complete description of the ink releasing member, applicants refer to U.S. Pat. No. 2,989,493. The resins, plasticizers, oils, dyes, pigments and incidental additives disclosed in this patent along with the process for preparing, coating, and finishing the ink transfer members are suitable for use in the ink releasing members of the present invention.

In the preparation of the ink transfer members of U.S. Pat. No. 2,989,493, considerable fuming and smoking takes place during fusion of the plastisol. The smoke and fumes are produced by the noncompatible oil plasticizer present in the composition. Experimentation has shown that an excess of this oily material is necessary to produce sufficient color intensity in the transferred ink along with a reasonable useful life of the coating. The excess oil is used to compensate for that driven off during the fusion process.

In order to eliminate or at least substantially reduce the air pollution caused by these oily materials, applicants tested numerous liquid materials in the plastisol ink releasing compositions. It was discovered during the course of this experimentation that not any oil vehicle could be used. The testing of numerous compounds from different organic chemical families led to the discovery that certain polyglycol materials could be used as replacements for the oil colorant vehicle in the ink releasing members.

From the experimentation carried out, a set of criteria were derived which the polyglycol had to meet in order to be an effective replacement for the oil. The polyglycol must be substantially non-water soluble and substantially non-hygroscopic. A low affinity for water is very important to maintain the surface cleanliness of the ink releasing member and to prevent moisture on the skin from picking up the liquid ink. Also, a hygroscopic polyglycol would absorb moisture from the air causing the liquid ink contained within the plastisol to expand and swell out of the matrix substantially destroying the usefulness of the ink transfer member. Polyglycols having water solubilities up to approximately three grams per 100 grams of water at 25° C are suitable. It is preferred, however, that the polyglycol be insoluble in water or at least only very slightly soluble.

The polyglycol should also have a low viscosity at room or ambient temperature so that it can be readily expressed from the plastisol matrix on the application of pressure. If the material has too high a viscosity, it will tend to resist flowing from the matrix and, in turn, reduce the write intensity of the ink releasing member. A viscosity in the range of approximately 70 to 700 centistokes at 77° F is acceptable with the preferred viscosity being in the range from 200 to 400 centistokes at 77° F.

The vapor pressure of the plastisol should be very low, particularly in the fusion range of 175° C to 205° C. If the polyglycol has only a negligible vapor pressure at the plastisol fusion temperature, then the fuming and smoking will be eliminated and it becomes unnecessary to add excess polyglycol to compensate for the loss during fusion.

Another important criteria in the selection of a suitable polyglycol is its ability to dissolve and disperse colorant materials. The polyglycol selected should have the ability to form a liquid ink with the selected colorant dye and/or pigment. If the polyglycol cannot disperse the colorant material, separation will occur and only the clear polyglycol or a tinted polyglycol will be expressed from the ink releasing layer on the application of pressure. The writing intensity of the ink releasing layer would then be substantially impaired, if not destroyed.

Numerous compounds were tested in arriving at the selection criteria and in determining the preferred materials. For example, liquid halocarbons having low vapor pressures, lack of water solubility and low viscosity are commercially available. The halocarbons failed in their ability to dissolve and disperse the selected colorants. Ethylene glycol and polyethylene glycols such as triethylene glycol were also tested. These glycols have low vapor pressures, low viscosity, the ability to dissolve and disperse selected colorants. These glycols, however, are water soluble and hygroscopic and produced unsuitable ink releasing members as the ink tended to bleed from the matrix and to be free on the surface.

Th preferred polyglycols are the polypropylene glycols having the general formula $HO(C_3H_6O)_nC_3H_6OH$ and with a molecular weight within the range of 1000 to 5000. The polypropylene glycols were found to meet all of the selection criteria and are commercially available. The Dow Chemical Company produces a series of polypropylene glycols under the designation Polyglycol P along with the number designating the average molecular weight. For example, the preferred polypropylene glycol is Polyglycol P 2000.

Substantially identical polypropylene glycols are also available from other commercial sources. For example, Propylene Glycol 2025 is available from the Union Carbide Corporation and corresponds to Polyglycol P 2000.

Other polyglycols have also been found to meet the selection criteria and to be acceptable. For example, a triol derived from ethylene and propylene oxides with a molecular weight of approximately 4500 and sold by Dow Chemical Company under the designation Polyglycol 112-2 has also been found to be a good replacement for the oily ink vehicle. The particular chemical formulation of the polyglycol does not appear to be critical so long as the polyglycol meets the aforementioned selection criteria.

The polyglycol can be used to replace all of the conventional oil vehicle in the ink transfer member. However, this does not appear to be a desirable course of action in view of the cost of the respective materials. The polyglycols are substantially more expensive than the conventional oils and should therefore preferably be used only in an amount necessary to meet or accomplish the desired goal.

The following materials can be used in preparing the ink releasing member. These materials are in many cases identical to the materials disclosed in U.S. Pat. No. 2,989,493.

| | | |
|---|---|---|
| 1. | Polyvinyl Chloride | |
| | Geon 121 | B. F. Goodrich |
| | Geon 128 | B. F. Goodrich |
| | Geon 130 × 17 | B. F. Goodrich |
| | QYNV | Union Carbide Corp. |
| | Marvinol VR50 | Uniroyal Corp. |
| | FPC 654 | Firestone Plastics Co. |
| 2. | Plasticizing Oils | |
| | dioctyl phthalate | |
| | dibutyl phthalate | |
| | tricresyl phosphate | |
| | trioctyl phosphate | |
| | Flexol 3 GH (triethylene glycol di -2 ethyl butyrate), Union Carbide Corp. | |

-continued

| | |
|---|---|
| 3. Oils | |
| mineral oil | |
| peanut oil | |
| sperm oil | |
| oleic acid | |
| castor oil | |
| 4. Colorants | |
| alkali blue paste (40% by weight pigment in mineral oil) | |
| carbon black | |
| Nigrosine black (33% by weight base in oleic acid) | |
| Milori blue | |
| 5. Incidental Additives | |
| clay | |
| Vanstay 6172 (a blend of barium, cadmium and zinc organic compounds and complexing agents) R. T. Vanderbilt Co., Inc., Norwalk, Conn. | |
| 6. Polyglycol | |
| Polyblycol P 1200 | Dow Chemical Co. |
| Polyglycol P 2000 | Dow Chemical Co. |
| Polyglycol P 4000 | Dow Chemical Co. |
| Polyglycol P 112-2 | Dow Chemical Co. |
| Propylene Glycol 1025 | Union Carbide Corp. |
| Propylene Glycol 2025 | Union Carbide Corp. |

Other polyglycols can also be used which meet the selection criteria of substantial insolubility in water, substantially non-hygroscopic, low viscosity at ambient temperatures, negligible vapor pressure at the plastisol fusion temperature and good solubility and dispersing power for dyes and pigments.

The following examples are illustrative of compositions used in preparing the ink releasing members:

EXAMPLE 1

| | Parts by Weight |
|---|---|
| Geon 128 | 50.0 |
| dioctyl phthalate | 20.0 |
| trioctyl phosphate | 0.5 |
| mineral oil | 8.0 |
| alkali blue pigment | 6.0 |
| Polyglycol P 112-2 | 8.0 |
| clay | 1.5 |

In preparing the ink transfer composition, the colorant material, the clay, the mineral oil and polyglycol are pre-mixed in a roller mill until a uniform mixture is found. The vinyl chloride resin in the form of finely divided particles is also pre-mixed with the dioctyl phthalate and trioctyl phosphate, the solvent-type plasticizer, in a planetary mixer. The two are then combined and mixed in a planetary mixer until the resin particles are well dispersed throughout the liquid.

After mixing, if the composition is to be used in preparing an ink transfer member such as carbon paper, the composition is coated onto a film substrate such as paper or a synthetic resin film such as Mylar using any suitable coating apparatus. A reverse roll coater or a trailing blade coating apparatus is suitable for coating the composition. The composition is fused after coating by heating it to a temperature sufficiently high for the solvent-type plasticizer to solvate the resin particles. Fusion can be accomplished by passing the coated substrate over a roll heated to a temperature of about 175° C to 205° C, or by use of infrared lamps.

During the fusion process, only a minor amount of fuming or smoking takes place due to the small amount of mineral oil in the composition. The temperature and length of time of the fusion process can also be controlled to further reduce the small amount of fumes remaining.

Along with the elimination of the air pollution problem, it has been found that the addition of polyglycols substantially increases the write intensity and the useful life of the ink releasing member. The polyglycols appear to be better vehicles for the colorant materials than the previously used oils. Comparative testing of ink releasing members, with and without polyglycols, in an automatic printer has shown the polyglycol containing composition to produce a darker write for a longer useful life.

The following are additional examples of compositions for the preparation of ink transfer members. The method of mixing, coating, and fusing is the same as that described in relation to EXAMPLE 1.

EXAMPLE 2

EXAMPLE 2

| | Parts by Weight |
|---|---|
| Geon 121 resin | 42.5 |
| dibutyl phthalate | 10.6 |
| Flexol 3 GH | 10.6 |
| alkali blue paste | 23.0 |
| Polyglycol P 2000 | 9.0 |
| Vanstay 6172 | 2.0 |
| Nigrosine black | 3.0 |

EXAMPLE 3

EXAMPLE 3

| | |
|---|---|
| Geon 121 resin | 40.0 |
| dibutyl phthalate | 15.0 |
| Flexol 3 GH | 5.0 |
| alkali blue paste | 20.0 |
| Polyglycol P 2000 | 5.0 |
| Vanstay 6172 | 1.0 |
| Nigrosine black | 4.0 |

Note in EXAMPLES 2 and 3 that the only mineral oil added is that mixed with the blue pigment in the alkali blue paste.

While the compositions of the present invention have been described for preparing coating compositions for duplicating media such as paper, this being an eminently suitable application therefor, it will be appreciated that such compositions are not limited to this application but can be used for preparing many other types of ink transfer or ink releasing compositions, such as self-supporting solid articles as ink pads and the like. Many modifications, variations and equivalents of the compositions herein disclosed for illustrative purposes will be readily apparent to those skilled in the synthetic resin art and are intended to be included in the scope of the invention as defined in the following claims.

What is claimed is:

1. In an ink releasing member of the plastisol matrix type in which a liquid ink is suspended within the pores of the matrix the improvement wherein a liquid polyglycol of low vapor pressure at the fusion temperature of the plastisol, low viscosity at ambient temperature, substantial insolubility in water, substantially non-hygroscopic and effective as a dispersant for colorant materials is used as the vehicle for the liquid ink, said polyglycol having a molecular weight substantially in the range of 1000 to 5000 and being selected from a group consisting of polypropylene glycol and triols of ethylene and propylene.

2. An ink releasing member of the type set forth in claim 1 wherein the vehicle for the liquid ink is a polypropylene glycol.

3. An ink releasing member of the type set forth in claim 1 wherein the vehicle for the liquid ink is comprised of one or more glycols having a molecular weight within the range of 1,000 to 5,000.

4. An ink releasing member of the type set forth in claim 2 wherein the vehicle for the liquid ink is a polypropylene glycol having a molecular weight within the range of 1000 to 5000.

5. An ink releasing member of the type set forth in claim 2 wherein up to 15 weight percent of the vehicle for the liquid ink is a polypropylene glycol with the remainder being an animal, vegetable, mineral, marine, or synthetic oil.

6. An ink releasing member of the type set forth in claim 2 wherein 5 to 8 weight percent of the vehicle for the liquid ink is a polypropylene glycol with the remainder being an animal, vegetable, mineral, marine, or synthetic oil.

7. An ink releasing member of the type set forth in claim 3 wherein up to 15% of the vehicle for the liquid ink is a mixture consisting of one or more glycols and oil, said oil being an animal, vegetable, mineral, marine or synthetic oil.

8. An ink releasing member of the type set forth in claim 3 wherein up to 15% of the vehicle for the liquid ink is a mixture consisting of one or more glycols and oil, said oil being an animal, vegetable, mineral, marine or synthetic oil.

9. In an ink releasing member having a plastisol type matrix supporting a liquid ink which is expressible from the matrix under pressure, the liquid ink comprising an oily vehicle and a colorant, the improvement wherein a portion of the oily vehicle in the liquid ink is a polypropylene glycol having a molecular weight substantially in the range of 1000 to 5000 and which has a low vapor pressure at the fusion temperature of the plastisol, a low viscosity at ambient temperatures, substantial insolubility in water, substantially non-hygroscopic, and effectiveness as a solvent and dispersant for the colorant.

10. An ink releasing member of the type set forth in claim 9 wherein up to approximately 15 weight percent of the oily vehicle is a polypropylene glycol.

11. In an ink releasing member having a plastisol type matrix supporting a liquid ink which is expressible from the matrix under pressure, the liquid ink comprising an oily vehicle and a colorant, the improvement wherein a portion of the oily vehicle in the liquid ink is a mixed glycol having a molecular weight substantially in the range of 1000 to 5000 which has a low vapor pressure at the fusion temperature of the plastisol, a low viscosity at ambient temperatures, substantial insolubility in water, substantially non-hygroscopic, and effectiveness as a solvent and dispersant for the colorant.

* * * * *